United States Patent
Clossen-von Lanken Schulz et al.

(10) Patent No.: US 12,313,596 B2
(45) Date of Patent: May 27, 2025

(54) METHOD FOR THE NONDESTRUCTIVE CRACK TESTING OF SURFACES OF ROTOR BLADE-RECEIVING BLADE RECEPTION SLOTS OF A ROTOR, AND ULTRASOUND DEVICE

(71) Applicant: Siemens Energy Global GmbH & Co. KG, Munich (DE)

(72) Inventors: Michael Clossen-von Lanken Schulz, Issum (DE); Stefan Obermayr, Duisburg (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 261 days.

(21) Appl. No.: 17/796,663

(22) PCT Filed: Jan. 15, 2021

(86) PCT No.: PCT/EP2021/050781
§ 371 (c)(1),
(2) Date: Jul. 31, 2022

(87) PCT Pub. No.: WO2021/160369
PCT Pub. Date: Aug. 19, 2021

(65) Prior Publication Data
US 2023/0333060 A1   Oct. 19, 2023

(30) Foreign Application Priority Data
Feb. 11, 2020   (DE) .................... 10 2020 201 671.2

(51) Int. Cl.
*G01N 29/04*   (2006.01)
*G01N 29/22*   (2006.01)
(Continued)

(52) U.S. Cl.
CPC ......... *G01N 29/043* (2013.01); *G01N 29/225* (2013.01); *G01N 29/262* (2013.01);
(Continued)

(58) Field of Classification Search
CPC .. G01N 29/043; G01N 29/225; G01N 29/262; G01N 2291/044; G01N 2291/106; G01N 2291/2693
(Continued)

(56) References Cited

U.S. PATENT DOCUMENTS 4,502,331 A * 3/1985 Singh .................... G01N 29/11
                                                      73/633
6,082,198 A * 7/2000 Sabourin ............. G01N 29/262
                                                      73/633
(Continued)

FOREIGN PATENT DOCUMENTS

CN      107923252 A  *  4/2018  ............... F01D 5/26
DE  102014106296 A1  * 11/2014  ............. G01N 29/11
(Continued)

OTHER PUBLICATIONS

P.Crowther et al., Practical Experience of Phased Array Technology for Power Station Applications, 16th World Conference on NDT—2004—Montreal (Canada), pp. 7 (Year: 2004).*
(Continued)

*Primary Examiner* — Stephanie E Bloss
*Assistant Examiner* — Kevin C Butler
(74) *Attorney, Agent, or Firm* — Wolter Van Dyke Davis, PLLC

(57) ABSTRACT

A method for the nondestructive crack testing of surfaces of rotor blade-receiving blade reception slots of a rotor, includes the following steps: positioning a guide rail on a rotor surface section between two rotor blades; positioning an ultrasound test head oriented in the direction of at least
(Continued)

one blade reception slot and is moveable in a manner guided along a trajectory predefined by the shape of the guide rail; moving the test head along the trajectory in the installed state of two adjacently arranged rotor blades and checking the surface of the blade reception slot for the presence of cracks using the ultrasound test head, wherein cracks that are present are detected in the form of data using the ultrasound test head; diagnosing the rotor state on the basis of the data.

15 Claims, 4 Drawing Sheets

(51) Int. Cl.
   *G01N 29/26* (2006.01)
   *G01N 29/265* (2006.01)
(52) U.S. Cl.
   CPC ..... *G01N 29/265* (2013.01); *G01N 2291/044* (2013.01); *G01N 2291/106* (2013.01); *G01N 2291/2693* (2013.01)
(58) Field of Classification Search
   USPC .......................................................... 73/620
   See application file for complete search history.

(56) References Cited

U.S. PATENT DOCUMENTS

| | | | |
|---|---|---|---|
| 2010/0150726 A1* | 6/2010 | Rose | F01D 5/3007 73/632 |
| 2011/0000301 A1 | 1/2011 | Clossen-Von Lanken Schulz et al. | |
| 2014/0144241 A1 | 5/2014 | Clossen-Von Lanken Schulz et al. | |
| 2014/0200853 A1* | 7/2014 | Guan | G06T 17/00 702/189 |
| 2015/0153310 A1* | 6/2015 | Yamamoto | G01N 29/0645 73/627 |
| 2018/0095006 A1* | 4/2018 | Clossen-Von Lanken Schulz | G01N 27/902 |

FOREIGN PATENT DOCUMENTS

| | | | | |
|---|---|---|---|---|
| DE | 102016219171 A1 * | 4/2018 | ........... | F01D 21/003 |
| DE | 102020201671 A1 * | 8/2021 | ........... | G01N 29/043 |
| EP | 2096433 A1 * | 9/2009 | ........... | G01N 29/225 |
| EP | 2418483 A1 * | 2/2012 | ........... | G01N 29/043 |
| EP | 2447714 A1 * | 5/2012 | ............... | G01H 1/10 |
| JP | 2004245834 A * | 9/2004 | ........... | G01N 29/043 |
| JP | 2015523576 A * | 8/2015 | ............ | G01M 99/00 |
| JP | 6300225 B2 * | 3/2018 | ............. | G01N 29/04 |
| JP | 2019184409 A * | 10/2019 | | |
| JP | 7480020 B2 * | 5/2024 | | |
| KR | 100358085 B1 * | 5/2001 | ............. | G01N 29/04 |
| KR | 20150055156 A * | 5/2015 | ............. | G01N 27/90 |
| KR | 101847922 B1 * | 8/2016 | ............. | G01N 29/04 |
| KR | 20160092909 * | 8/2016 | ............. | G01N 29/04 |
| WO | WO-2016024475 A1 * | 2/2016 | ........... | G01N 29/043 |
| WO | WO-2019223950 A1 * | 11/2019 | ........... | F01D 21/003 |
| WO | WO-2021160369 A1 * | 8/2021 | ........... | G01N 29/043 |

OTHER PUBLICATIONS

Norihide Matsumura et al, Development of Ultrasonic Fiaw Detection Equipment for Inspection of Dovetails of Low-Pressure Turbine Rotors, Proceedings of the International Conference on Power Engineering-003, Nov. 9-13, 2003 Kobe Japan pp. 6 (Year: 2003).*
PCT International Search Report and Written Opinion of International Searching Authority mailed Apr. 7, 2021 corresponding to PCT International Application No. PCT/EP2021/050781 filed Jan. 15, 2021.

* cited by examiner

METHOD FOR THE NONDESTRUCTIVE CRACK TESTING OF SURFACES OF ROTOR BLADE-RECEIVING BLADE RECEPTION SLOTS OF A ROTOR, AND ULTRASOUND DEVICE

CROSS REFERENCE TO RELATED APPLICATIONS

This application is the US National Stage of International Application No. PCT/EP2021/050781 filed 15 Jan. 2021, and claims the benefit thereof. The International Application claims the benefit of German Application No. DE 10 2020 201 671.2 filed 11 Feb. 2020. All of the applications are incorporated by reference herein in their entirety.

FIELD OF INVENTION

The invention relates to a method for the crack testing of surfaces of blade receptacle slots of a rotor, said slots receiving rotor blades, wherein the blade receptacle slots are arranged in a manner distributed at uniform distances along the periphery of the rotor and the rotor blades received in said slots are spaced apart from one another in such a way that an externally accessible crescent- or strip-shaped rotor surface section extends in each case between adjacently arranged rotor blades. Furthermore, the invention relates to an ultrasonic device designed for carrying out a method according to the invention.

BACKGROUND OF INVENTION

Primarily in the field of turbines, components are subject to high mechanical, chemical and thermal loads, with the possibility of attendant wear and destruction. In the region of the blade receptacle slots that are formed on the rotor and hold the rotor blades of the turbine, the stress gives rise to cracking, for example, which can greatly reduce the lifetime of the rotor.

Against this background, the blade receptacle slots of turbine rotors are regularly subjected to surface crack testing. The surface crack testing is carried out nondestructively with the rotor blades having been demounted, for example by means of dye penetration testing, eddy current metrology, ultrasound or the like. In this regard, the applicant currently uses for example a surface crack testing method in which cracks and the position thereof are acquired in terms of data using an eddy current detection tool that is moved manually through the blade receptacle slots. Material-removing processing tools are then used to eliminate detected cracks.

One disadvantage of the known surface crack testing methods is that the demounting of the rotor blades, the subsequent crack testing, the possibly required elimination of cracks and the reinstallation of the rotor blades amount to a great effort and take up a great deal of time, which is also associated with high costs. This is the case even if no relevant cracks are detected in the context of the surface crack testing.

SUMMARY OF INVENTION

Taking this prior art as a departure point, it is an object of the present invention to provide an alternative method for the surface crack testing of the surfaces of rotor blade-receiving blade receptacle slots of a rotor and also an alternative ultrasonic device for carrying out such a method.

In order to achieve this object, the present invention provides a method for the nondestructive crack testing of surfaces of blade receptacle slots of a rotor, said slots receiving rotor blades, wherein the blade receptacle slots are arranged in a manner distributed at uniform distances along the periphery of the rotor and the rotor blades received in said slots are spaced apart from one another in such a way that an externally accessible crescent- or strip-shaped rotor surface section extends in each case between adjacently arranged rotor blades, comprising the following steps: a) positioning a guide rail on a rotor surface section extending between two rotor blades in such a way that the guide rail extends along at least one blade receptacle slot to be checked, and securing the guide rail; b) positioning an ultrasonic test head in such a way that the latter is oriented in the direction of at least one blade receptacle slot to be tested and is movable in a manner guided along a trajectory predefined by the shape of the guide rail; c) moving the ultrasonic test head along the trajectory in the installed state of the two adjacently arranged rotor blades and at the same time checking the surface of the blade receptacle slot to be tested for the presence of cracks using the ultrasonic test head, wherein cracks that are present are acquired in terms of data using the ultrasonic test head; d) storing the acquired data; e) repeating steps a) to d) for checking the surfaces of further blade receptacle slots for the presence of cracks; and f) diagnosing the rotor state on the basis of the data stored in step d).

One major advantage associated with the method according to the invention is that the rotor blades do not have to be demounted in order to carry out the method. Accordingly, the method is associated with little effort and low costs.

In accordance with one configuration of the present invention, the shape of the guide rail predefining the trajectory is determined in advance using an ultrasonic simulation and the guide rail is additively manufactured on the basis of the determined shape. An ultrasonic simulation on the basis of 3D CAD data of the rotor makes it possible to ascertain the optimum trajectory for the ultrasonic test head and thus the optimum shape of the guide rail along which the ultrasonic test head has to be moved in order to be able to check all relevant surfaces of a blade receptacle slot at which experience has shown that cracking should most likely be expected. The additive manufacturing of the guide rail on the basis of the determined shape of the guide rail then enables simple, inexpensive and rapid manufacturing of the guide rail.

In step a) the guide rail can be secured to the rotor and/or to the rotor blades magnetically and/or in a force-locking manner and/or in a positively locking manner. Magnetic and at least partly positively locking securing is advantageous since there is no need to carry out mechanical processing on the rotor or on the rotor blades thereof.

Advantageously, the ultrasonic test head is a phased array ultrasonic test head. This is advantageous to the effect that entire surface regions can be scanned without sensor movement. The angle of incidence into the tool is arbitrarily adjustable within predefined limits, and so the relevant surfaces of a blade receptacle slot can be checked in the context of a single movement of the ultrasonic test head along the trajectory.

Advantageously, in step c) data regarding the shapes and dimensions of cracks that are present are acquired using the ultrasonic test head. This is advantageous in particular for the subsequent diagnosing since the influence of cracks that are present on the rotor lifetime that is still to be expected can be appraised very well on the basis of the crack geometry. Accordingly, it is possible to make a statement about whether or not an immediate repair of the detected cracks is necessary.

In accordance with one configuration of the present invention, in step c) data regarding the respective location of the cracks that are present are acquired and stored, in particular on the basis of actual positions of the ultrasonic test head at the point in time of a crack detection. Firstly, the location of a crack may influence the relevance thereof with regard to the rotor lifetime that is still to be expected. Secondly, knowledge of the location of a crack is of importance for repair work that may possibly follow.

Advantageously, in step c) the ultrasonic test head is moved manually along the trajectory, as a result of which the construction of the ultrasonic test device is significantly simplified since no drive means need be provided.

In accordance with one configuration of the present invention, the method according to the invention does not involve checking the surfaces of all of the blade receptacle slots, but rather involves only checking the surfaces of some blade receptacle slots in the manner of random sampling. The diagnosing of the entire rotor in step f) is then carried out on the basis of empirical values. Alternatively, of course, a fully comprehensive check of all the blade receptacle slots can also be carried out.

Accordingly, the time duration required for carrying out the method is shortened. A very reliable diagnosis can nevertheless be made on the basis of the wealth of experience obtained in the context of previous tests.

Advantageously, on the basis of the diagnosing of the rotor, a decision is taken as to whether there is a need for mechanical processing of the detected cracks at the present point in time.

In accordance with one configuration of the present invention, the blade receptacle slots are fir tree-shaped blade receptacle slots.

Advantageously, the rotor is the rotor of a steam turbine.

Furthermore, the present invention provides an ultrasonic device, which is designed for carrying out the method according to the invention, comprising a guide rail and an ultrasonic test head, which is movable along the guide rail.

The ultrasonic device advantageously has a housing defining the guide rail, and an ultrasonic test head holder, which is movable in a manner guided along the guide rail and to which the ultrasonic test head is secured, in particular is releasably secured.

The shape of the housing advantageously is adapted to the shape of the rotor surface sections and/or to the shape of at least one rotor blade in such a way that the housing is positionable areally in a manner resting on a rotor surface section and/or in a positively locking manner bearing against a rotor blade. By virtue of such a configuration, the housing and thus the guide rail can be positioned against a rotor surface section exactly with high reproducibility.

Advantageously, a push rod is secured to the ultrasonic test head holder, said push rod being provided with a handle at its free end. Such a push rod enables the ultrasonic test head holder together with the ultrasonic test head held thereon to be moved in a simple manner along the trajectory predefined by the guide rail, the handle ensuring convenient handling.

Advantageously, an encoder is held against the housing, said encoder being configured and positioned in such a way that it detects the actual position of the ultrasonic test head holder and thus the actual position of the ultrasonic test head. By virtue of such an encoder, the positions of cracks that are present can be detected by crack data being assigned to the respective actual positions of the ultrasonic test head at the point in time of detection.

BRIEF DESCRIPTION OF THE DRAWINGS

Further features and advantages of the invention will become clear on the basis of the following description of one embodiment of the method according to the invention and one embodiment of an ultrasonic test device used for carrying out the method, with reference to the accompanying drawing, in which.

DETAILED DESCRIPTION OF INVENTION

Figure 1:
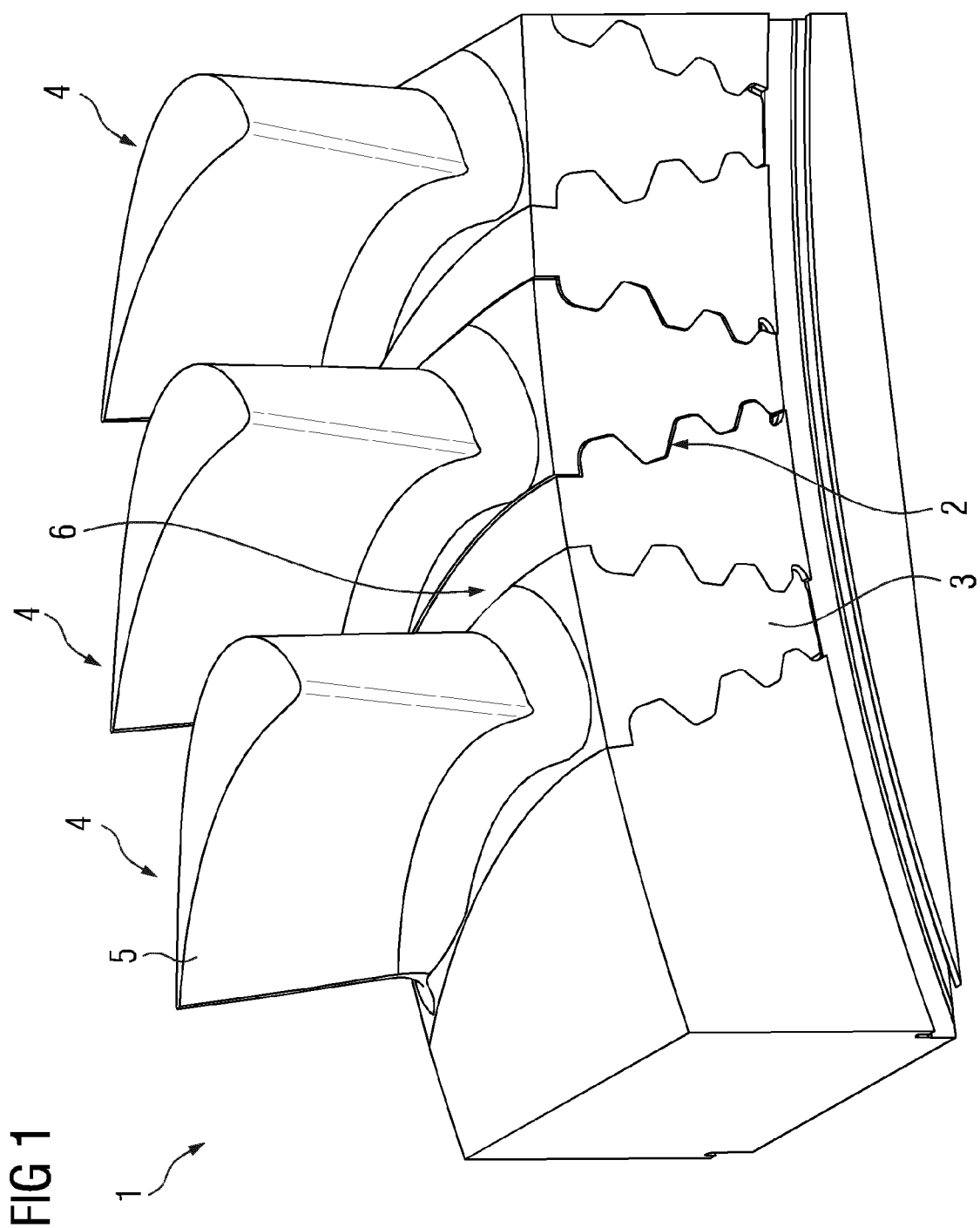
FIG. 1 is a perspective schematic partial view of an exemplary rotor.

FIG. 1 shows a partial region of a rotor 1, which is in particular the rotor of a steam turbine. The rotor 1 comprises a plurality of blade receptacle slots 2 having identical dimensions and embodied with a fir-tree shape in the present case. The blade receptacle slots 2 are arranged in a manner distributed at uniform distances along the periphery of the rotor 1. The blade root 3 of a rotor blade 4 is inserted into each blade receptacle slot 2, the shape of said blade root being embodied in a manner corresponding to the shape of the blade receptacle slot 2 for this purpose. The blade airfoils 5 of the rotor blades 4 adjacent to the blade roots 3 project radially outward in a known manner. An externally accessible rotor surface section 6 embodied in a crescent-shaped fashion in the present case extends in each case between adjacently arranged rotor blades 4.

During operation, the rotor 1 is subject to high mechanical, chemical and thermal loads. On account of these loads, cracking can regularly be observed on the surfaces 7 of the blade receptacle slots 2 and can greatly reduce the lifetime of the rotor 1.

Against this background, the blade receptacle slots 2 are regularly subjected to surface crack testing in the context of maintenance work.

Figure 2:
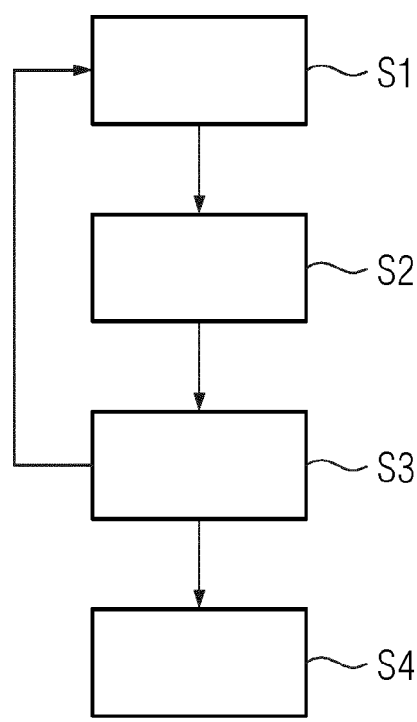
FIG. 2 is a flow diagram showing the steps of a method in accordance with one embodiment of the present invention.

FIG. 2 schematically shows the steps of a method in accordance with one embodiment of the present invention for the nondestructive crack testing of such surfaces 7 of the blade receptacle slots 2 of a rotor 1.

Figure 3:
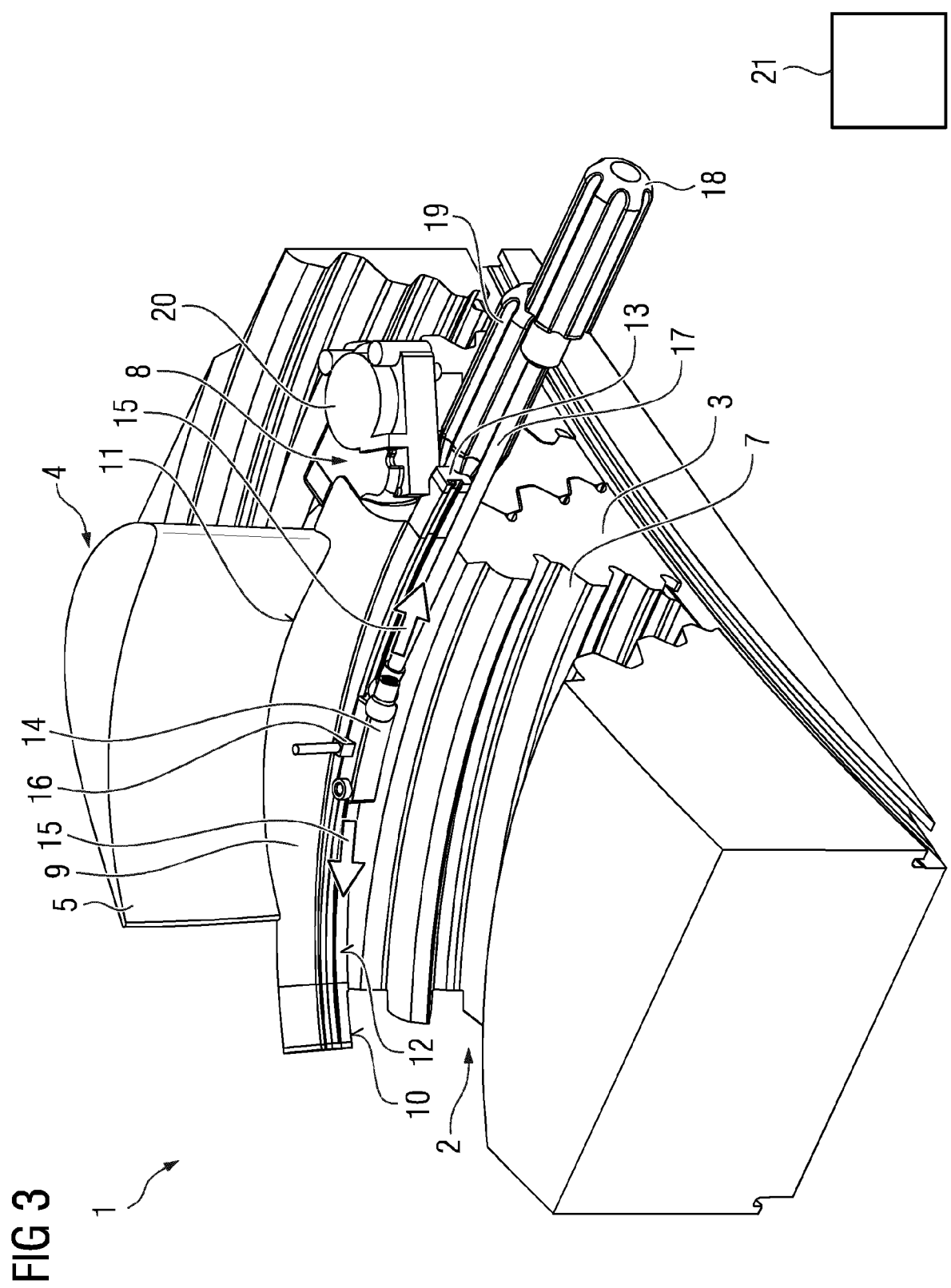
FIG. 3 is a view analogous to FIG. 1, wherein an ultrasonic device is positioned against the rotor and two of the three rotor blades are not illustrated for reasons of clarity.

In a first step S1, as is illustrated in FIG. 3, an ultrasonic device 8 is positioned on and secured to one of the rotor surface sections 6 extending between two rotor blades 4.

The ultrasonic device 8 shown in FIG. 3 comprises a housing 9, the shape and dimensions of which are adapted to the shape and dimensions of the rotor surface sections 6 of the rotor 1 in such a way that the housing 9 can be inserted between two adjacent rotor blades 4 in the region of a rotor surface section 6. In this case, the underside of the housing 9 is embodied in such a way that the housing 9 rests areally on the rotor surface section 6 in the mounted state. A first side surface 11 of the housing 9 is adapted to the contour of the blade airfoil 5 of an adjacent rotor blade 4 in a manner such that said side surface 11 bears against the blade airfoil 5 in a positively locking manner and forms an axial stop for the ultrasonic device 8. A guide rail 13 is formed on the opposite side surface 12 of the housing 9, in which guide rail an ultrasonic test head holder 14 is received movably to and fro in the direction of the arrows 15. An ultrasonic test head 16 is positioned advantageously releasably on the ultrasonic test head holder 14 in such a way that it is oriented in the direction of at least one blade receptacle slot 2 to be tested in the state shown in FIG. 3. In the present case, the ultrasonic test head 16 is embodied as a phased array ultrasonic test head, while other ultrasonic test heads can also be used in principle. A push rod 17 is linked to the ultrasonic test head holder 14 in an articulated manner, said push rod being provided with a handle 18 at its free end. A further handle 19 is fixedly positioned on the housing 9 and projects substantially axially outward from said housing. Furthermore, an encoder 20 is held against the housing 9, said encoder being configured and positioned in such a way that it detects the actual position of the ultrasonic test head holder 14 and thus the actual position of the ultrasonic test head 16. For this purpose, the encoder 20 can be embodied as a rope encoder, for example. Alternatively, of course, other encoder designs are also possible. For securing the housing 9 to the rotor 1, magnets that are not illustrated in more specific detail in the present case are positioned on the underside of the housing 9, for example a plurality of neodymium magnets. Alternatively or additionally, the housing 9, even though this is not the situation in the present case, can be secured to the rotor 1 in a force-locking manner, for example using clamping jaws that engage on axially opposite sides of the rotor 1.

The trajectory of the ultrasonic test head 16 that is predefined by the guide rail 13 and is required for checking desired surfaces 7 of a blade receptacle slot 2 was determined in advance using an ultrasonic simulation on the 3D CAD model of the rotor 1. Afterward, the shape of the housing 9 and of the guide rail 13 thereof was calculated on the basis of the 3D CAD model of the rotor 1 and also the determined trajectory and was then additively manufactured.

Positioning the ultrasonic device 8 on the rotor 1 and securing it thereto are carried out with the rotor blades 4 mounted. In principle, the rotor 1 itself does not have to be demounted from the turbine for this purpose. If there is a need to demount the rotor 1 in order to carry out other maintenance work, the method is advantageously carried out on the demounted rotor 1. For positioning purposes, the ultrasonic device 8 is simply placed in the region between two rotor blades 4 on the intervening rotor surface section 6 in such a way that the first side surface 11 of the housing 9 bears against the adjacent blade airfoil 5. During positioning, the ultrasonic device 8 can be held by the handle 19, which facilitates the handling of the ultrasonic device 8. The ultrasonic device 8 is secured automatically by way of the magnets provided on the underside 10 of the housing 9. With the proper positioning of the housing 9, at the same time the ultrasonic test head 16 held on the ultrasonic test head holder 14 is automatically aligned with the blade root receptacle slot 2 to be tested or with the blade root receptacle slots 2 to be tested.

Figure 4:
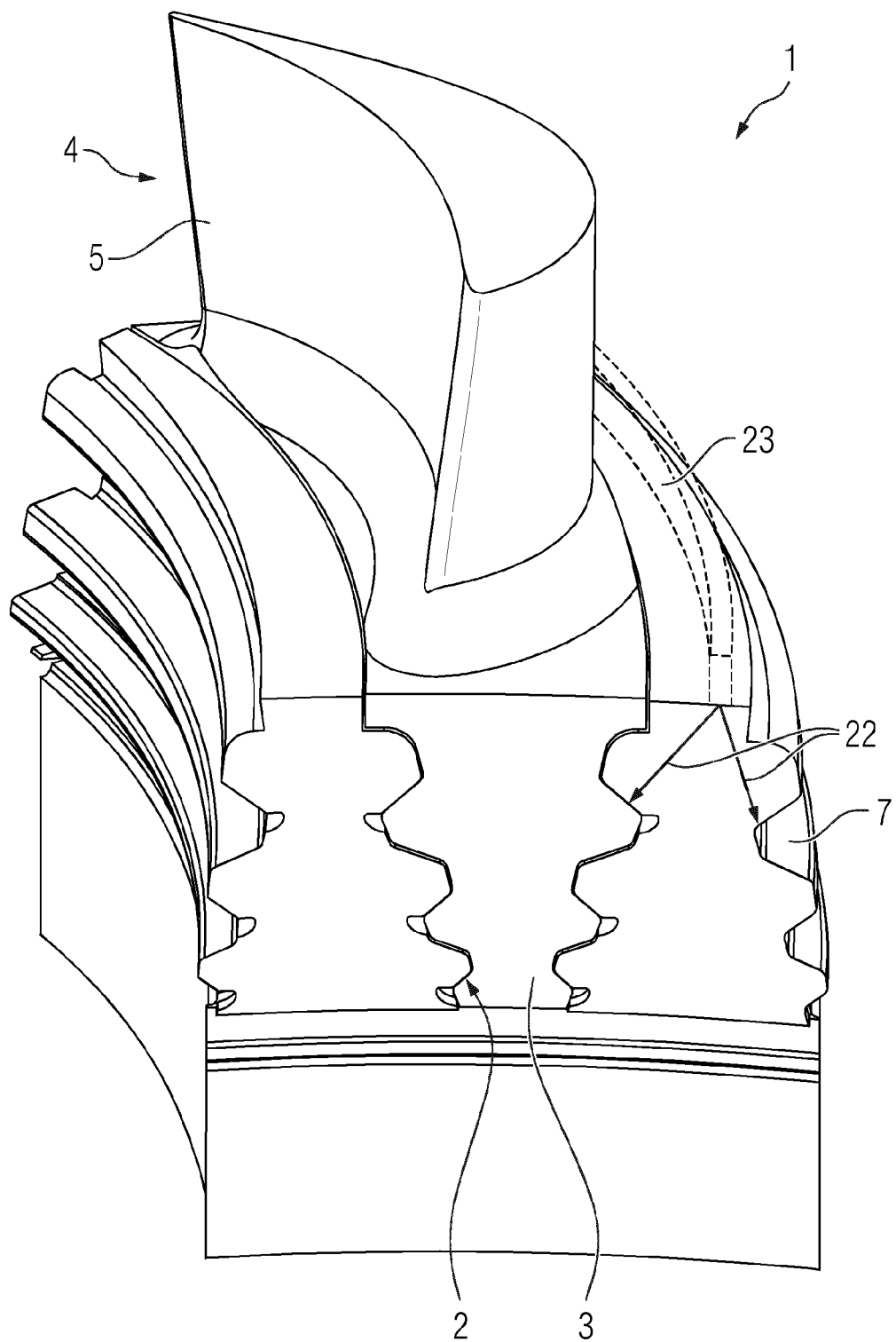
FIG. 4 shows a perspective view of a single rotor blade held on the rotor.

A further step S2 then involves moving the ultrasonic test head holder 14 and thus the ultrasonic test head 16 manually along the trajectory predefined by the guide rail 13 in the installed state of the two adjacently arranged rotor blades 4. The movement is effected using the push rod 17, the operator holding the handle 18 of said push rod with one hand. With the other hand the operator can grip the other handle 19 in order to stabilize the ultrasonic device 8. During the movement of the ultrasonic test head 16 along the trajectory thereof, in the present case the mutually facing surface regions of two adjacently arranged blade receptacle slots 2 are checked for the presence of cracks using the ultrasonic test head 16, as is indicated by the arrows 22 in FIG. 4, wherein cracks that are present are acquired in terms of data and stored in a data storage and analysis unit 21 in step S3. The trajectory 23 is indicated by dashed lines in FIG. 4.

Afterward, steps S1 to S3 are repeated in order to check surfaces 7 of further blade receptacle slots 2 for the presence of cracks. The present method does not involve checking the surfaces 7 of all of the blade receptacle slots 2. Rather, only surfaces 7 of some blade receptacle slots 2 are checked in the manner of random sampling. The number of surfaces checked must be chosen in such a way that data present are sufficiently representative to be able to make a statement about the rotor state on the basis of the stored data and also on the basis of empirical values in a subsequent diagnosing step S4. In the context of the diagnosing, a decision is taken as to whether there is a need for repair of the cracks at the present point in time. Alternatively, a fully comprehensive check of all of the blade receptacle slots 2 can also be carried out.

The method according to the invention is distinguished in particular by the fact that it is carried out with rotor blades 4 mounted on the rotor 1. Accordingly, the rotor blades 4 do not have to be demounted and subsequently mounted again.

Although the invention has been more specifically illustrated and described in detail by means of the exemplary embodiment, nevertheless the invention is not restricted by the examples disclosed and other variations can be derived therefrom by the person skilled in the art, without departing from the scope of protection of the invention.

The invention claimed is:

1. A method for nondestructive crack testing of surfaces of blade receptacle slots of a rotor, said slots receiving rotor blades, wherein the blade receptacle slots are arranged in a manner distributed at uniform distances along a periphery of the rotor and the rotor blades received in said slots are spaced apart from one another in such a way that an externally accessible crescent- or strip-shaped rotor surface section extends in each case between adjacently arranged rotor blades, the method comprising:
    a) positioning an ultrasonic device comprising a housing defining a guide rail on a rotor surface section extending between two rotor blades in such a way that the guide rail extends along at least one blade receptacle slot to be checked, and securing the guide rail, with the ultrasonic device comprising an ultrasonic test head holder to which an ultrasonic test head is secured, a push rod secured to the ultrasonic test head holder, a handle fixedly positioned on the push rod and projecting substantially axially outward from the push rod, and a further handle fixedly positioned on the housing and projecting substantially axially outward from the housing;
    b) positioning the ultrasonic test head in such a way that the ultrasonic test head is oriented in the direction of at least one blade receptacle slot to be tested and is movable in a manner guided along a trajectory predefined by the shape of the guide rail;
    c) while an operator is holding the further handle with one hand to stabilize the ultrasonic device, the ultrasonic test head is manually moved with the operator's other hand holding the handle positioned on the push rod along the trajectory in an installed state of two adjacently arranged rotor blades and at the same time checking the surface of the blade receptacle slot to be tested for a presence of cracks using the ultrasonic test head, wherein cracks that are present are acquired in terms of data using the ultrasonic test head;

d) storing the acquired data;

e) repeating steps a) to d) for checking the surfaces of further blade receptacle slots for the presence of cracks; and f) diagnosing a rotor state on the basis of the data stored in step d).

2. The method as claimed in claim 1, wherein the shape of the guide rail predefining the trajectory is determined in advance using an ultrasonic simulation and the guide rail is additively manufactured on the basis of the determined shape.

3. The method as claimed in claim 1, wherein in step a) the guide rail is secured to the rotor and/or to the rotor blades magnetically and/or in a force-locking manner and/or in a positively locking manner.

4. The method as claimed in claim 1, wherein the ultrasonic test head is a phased array ultrasonic test head.

5. The method as claimed in claim 1, wherein in step c) data regarding the shapes and dimensions of cracks that are present are acquired using the ultrasonic test head.

6. The method as claimed in claim 1, wherein in step c) data regarding the respective location of the cracks that are present are acquired and stored.

7. The method as claimed in claim 6, wherein in step c) data regarding the respective location of the cracks that are present are acquired and stored on the basis of actual positions of the ultrasonic test head at the point in time of a crack detection.

8. The method as claimed in claim 1, wherein said method does not involve checking the surfaces of all of the blade receptacle slots, but rather involves checking only surfaces of some blade receptacle slots in the manner of random sampling.

9. The method as claimed in claim 1, wherein on the basis of the diagnosing of the rotor, a decision is taken as to whether there is a need for mechanical processing of the detected cracks at the present point in time.

10. The method as claimed in claim 1, wherein the blade receptacle slots are fir tree-shaped blade receptacle slots.

11. The method as claimed in claim 1, wherein the rotor is the rotor of a steam turbine.

12. An ultrasonic device, which is designed for carrying out a method as claimed in claim 1, comprising a guide rail and an ultrasonic test head, which is movable along the guide rail.

13. An ultrasonic device, comprising:
a housing defining a guide rail,
an ultrasonic test head holder manually movable in a manner guided along the guide rail and to which an ultrasonic test head is secured,
a push rod secured to the ultrasonic test head holder,
a handle fixedly positioned on the push rod and projecting substantially axially outward from the push rod, and
a further handle fixedly positioned on the housing and projecting substantially axially outward from the housing.

14. The ultrasonic device as claimed in claim 13, wherein the shape of the housing is adapted to the shape of the rotor surface sections and/or to the shape of at least one rotor blade in such a way that the housing is resting on a rotor surface section and/or in a positively locking manner bearing against a rotor blade.

15. The ultrasonic device as claimed in claim 13, wherein an encoder is held against the housing, said encoder being configured and positioned in such a way that it detects the actual position of the ultrasonic test head holder and thus the actual position of the ultrasonic test head.

* * * * *